US011164037B2

United States Patent
Marder et al.

(10) Patent No.: US 11,164,037 B2
(45) Date of Patent: Nov. 2, 2021

(54) OBJECT INSTANCE AMBIGUITY RESOLUTION

(71) Applicant: International Business Machines Corporation, Armonk, NY (US)

(72) Inventors: Mattias Marder, Haifa (IL); Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 16/051,689

(22) Filed: Aug. 1, 2018

(65) Prior Publication Data

US 2020/0042824 A1 Feb. 6, 2020

(51) Int. Cl.
*G06K 9/62* (2006.01)
*G06K 9/00* (2006.01)
*G06T 17/00* (2006.01)
*G06T 7/70* (2017.01)
(Continued)

(52) U.S. Cl.
CPC ....... *G06K 9/6215* (2013.01); *G06F 16/5838* (2019.01); *G06F 16/5866* (2019.01); *G06K 9/00624* (2013.01); *G06T 7/70* (2017.01); *G06T 17/00* (2013.01); *G06T 2207/10016* (2013.01); *G06T 2207/20092* (2013.01)

(58) Field of Classification Search
CPC ............ G06K 9/6267; G06K 9/00624; G06K 9/6215; G06T 7/70; G06T 2207/10016; G06T 17/00; G06T 2207/20092; G06F 16/5838; G06F 16/5866
See application file for complete search history.

(56) References Cited

U.S. PATENT DOCUMENTS

| 2010/0103281 A1* | 4/2010 | Garg | H04N 5/232133 348/223.1 |
| 2012/0183204 A1* | 7/2012 | Aarts | G06T 15/205 382/154 |
| 2014/0325454 A1 | 10/2014 | Caduff | |

(Continued)

FOREIGN PATENT DOCUMENTS

EP 2993613 A1 3/2016

OTHER PUBLICATIONS

Gao et al., "Biologically Inspired Scene Context for Object Detection Using a Single Instance," PLoS ONE 9(5): e98447, May 28, 2014, 14 pages. https://doi.org/10.1371/journal.pone.0098447.

(Continued)

*Primary Examiner* — Margaret G Mastrodonato
(74) *Attorney, Agent, or Firm* — Nathan M. Rau

(57) ABSTRACT

A system and method for resolving an ambiguity between similar objects in an image is disclosed. A three dimensional representation of a room is generated, and objects in the room are identified from an image of the room are identified. A determination is made that at least two objects are visually similar, and a position of the two objects is ambiguous. At least one question based on the determined ambiguity is programmatically generated based on information known about the room, and is phrased such that the ambiguity can be resolved by an answer to the question. Based on the answer received one of the objects is selected. At least one property of the selected object is modified based upon the selection of one of the at least two objects.

20 Claims, 5 Drawing Sheets

(51) Int. Cl.
*G06F 16/583* (2019.01)
*G06F 16/58* (2019.01)

(56) References Cited

U.S. PATENT DOCUMENTS

| | | | |
|---|---|---|---|
| 2015/0254510 A1* | 9/2015 | McKinnon | G06F 16/50 |
| | | | 382/103 |
| 2015/0310301 A1 | 10/2015 | Zadeh | |
| 2016/0259975 A1 | 9/2016 | Saptharishi et al. | |
| 2018/0232608 A1* | 8/2018 | Pradeep | G06F 1/3231 |
| 2019/0005673 A1* | 1/2019 | Anderson | G06F 3/012 |

OTHER PUBLICATIONS

Gemen et al., "Visual Turing test for computer vision systems," PNAS: Proceedings of the National Academy of Sciences of the United States of America, Mar. 24, 2015, vol. 112, No. 12, pp. 3618-3623. http://www.pnas.org/content/112/12/3618.

Hsiao, E., "Addressing Ambiguity In Object Instance Detection," Thesis, The Robotics Institute, Carnegie Mellon University, Jun. 2013, 158 pages.

Sekii, T., "Robust, Real-Time 3D Tracking of Multiple Objects with Similar Appearances," CVPR paper provided by the Computer Vision Foundation, Dec. 2016, pp. 4275-4283.

"10 smart chatbot patents," mobilescout.com, Sep. 15, 2016, pp. 1-3. https://www.mobilescout.com/tech/news/n73287/chat-bot-patents.html%5Ch.

\* cited by examiner

OBJECT INSTANCE AMBIGUITY RESOLUTION

BACKGROUND

The present disclosure relates to object recognition, more specifically to resolving ambiguities when two or more similar objects appear in an image or field of view of a camera system.

A computer vision systems are capable of identifying and recognizing objects in an image. However, attempts to visually recognize an instance of some objects can fail when multiple visually similar objects appear in the image. Current approaches to computer vision recognition cannot adequately resolve these instances of ambiguity.

SUMMARY

An embodiment of the present disclosure is directed towards a system for resolving object ambiguity in an image. The system includes a camera, an object recognition component, a model generator, an ambiguity detector, and a question and answer system. The camera is disposed in a room or other location. The camera is configured to capture at least one image of the room that includes at least two objects that are visually similar. The object recognition component is configured to identify objects from an image, including the objects that are visually similar. The model generator generates a three-dimensional representation of the room. The ambiguity detector is configured to determine an ambiguity in a position of the two objects, based on that a location of the two objects cannot be programmatically determined from the at least one image. The question and answer system provides at least one question based on the determined ambiguity to a user. The at least one question is generated based on information known about the room from the model generator, and is phrased such that the ambiguity can be resolved. The question and answer system further receives an answer to the at least one question, and based on the answer resolves the ambiguity. The system is configured to change at least one property of the at least two objects based upon resolution of the ambiguity.

Other embodiments are directed to a method and computer program product for resolving an ambiguity between similar objects in an image. A three dimensional representation of a room or other location is generated. A plurality of objects in the room from at least one image of the room are identified. A determination is made that at least two objects in the plurality of objects are visually similar, and a position of the at least two objects is ambiguous. The ambiguity is based on that a location of the at least two objects cannot be programmatically determined from the at least one image. At least one question based on the determined ambiguity is programmatically generated. Where the question is based on information known about the room, and is phrased such that the ambiguity can be resolved by an answer to the question. A user provides an answer to the question. Based on the answer received one of the objects is selected. At least one property of the selected object is modified based upon the selection of one of the at least two objects.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
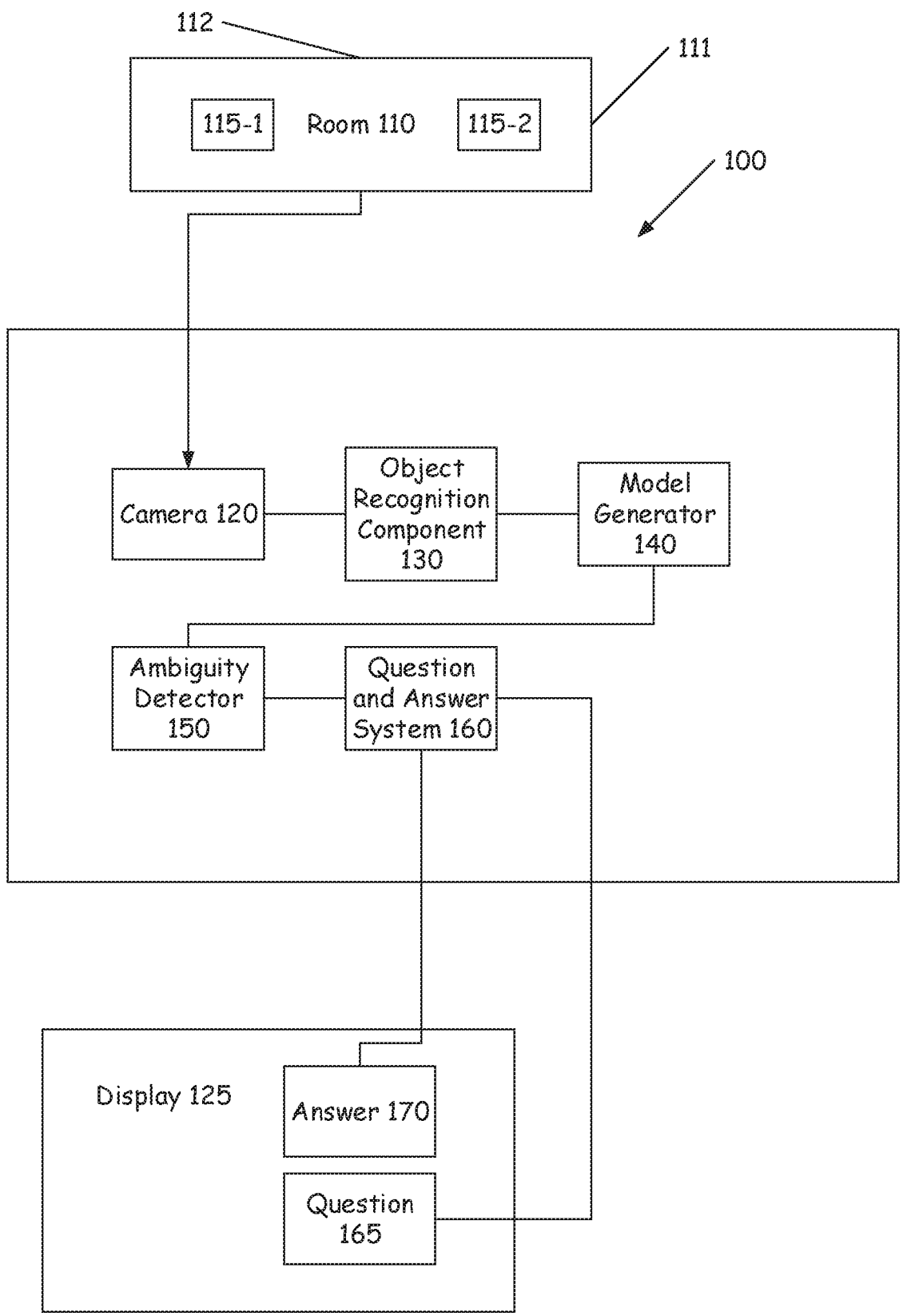
FIG. 1 is a block diagram illustrating system that uses a two-copy index for in-memory persistent data store, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to object recognition, more specifically to resolving ambiguities when two or more similar objects appear in an image or field of view of a camera system. While the present disclosure is not necessarily limited to such applications, various aspects of the disclosure may be appreciated through a discussion of various examples using this context.

Computer vision systems that attempt to recognize objects within an image run into issues when attempting to recognize an object when multiple visually similar objects appear in an image. For example, in a video teleconference there may be two speakers on a table that are identical. As both objects are identical the system can have difficulty in determining which of the two speakers the camera is focusing on. While the human eye is capable of easily determining what object the camera is being focused on, computer systems lack the ability to accurately determine what is the intended focus of the operator of the camera. Specifically, some context aware systems employ ambiguity resolution by attempting to identify visual similar objects by automatically tracking the user's position and/or sampling of the content. However, the accuracy of proximity sensors is a few feet and the ability to determine precisely the pointing direction of a camera is unreliable. This makes automatic recognition of a specific item, when multiple similar items are in the field of view, difficult.

FIG. 1 is a block diagram of a system for resolving object ambiguity in a context aware computer vision system. System 100 includes a room 110, at least one camera 120, object recognition component 130, model generator 140, ambiguity detector 150, and a question and answer system 160.

Room 110 is a location where cameras are used to provide images to individuals or organizations at a location outside of room 110. Room 110 can be a conference room 110, an auditorium, an office, a press center, or any other space where individuals congregate. Room 110 includes a number of objects that are located within the room 110. These objects can include, for example, speaker phones, chairs, projectors, pictures, doors, windows, tables, etc. Room 110 can be of any shape and can have four or more walls of which some of the walls may not be visible to the camera 120.

Camera 120 is a component of the system that is configured to capture an image of a room 110 or other location. There can be one or more cameras associated with system 100. Each of these cameras 120 can be located in different portions of the room 110, such that they are able to capture different viewpoints from within in the room 110. For example, one camera can be disposed on wall 111, while another camera is disposed on wall 112. However, camera 120 can be located anywhere within the room 110. In some embodiments, the camera 120 is a hand held or otherwise portable camera. Camera 120 further is configured to provide an image (still or moving) to the object recognition system. An image is captured by the camera. The image that is captured is one with in the field of view of the camera. Images can be captured in any format for generating digital images and video, such as jpg, png, gif, tif, bmp, wmv, avi, flv, mov, mp3, m4, or any other image or video format. In some embodiments the image that is captured may be displayed on a display 125 that is located within the room 110.

Object recognition component 130 is a component of the system that is configured to analyze images generated from the camera and determine the objects that are present in the image. These features can include objects, text, people, metadata, etc. However, any component of the image can be considered a feature of the image. For example, objects in the image can both animate and inanimate objects. The object recognition component 130 can use any object recognition technique (e.g. appearance based methods, feature based method, genetic algorithms methods, etc.). The object recognition component 130 accesses a library of objects, and locates an entry in the library matching the detected object in the image. The object recognition component 130 uses the library of images to perform comparison of objects in the image to images stored in the library to locate the matching item. In some embodiments, the object recognition component 130 accesses a data store that is accessed through a network. The data that is stored in the data store can include an association between objects and words related to the object. This association between objects and words, can be provided to the question and answer system 160 such that it can generate the questions using the appropriate words for the detected objects. In some embodiments the data store includes a plurality of objects that the object recognition component 130 can use to identify the object in the image. This data can be provided back to the object recognition component 130 to complete the recognition process.

The model generator 140 is component of the system that is configured to generate a three dimensional computer model of the room 110. In one embodiment a movie or other video is made of the room 110. These images from the movie are then used to create a three dimensional reconstruction of the room 110. Once the three dimensional reconstruction of the room 110 is made within the computer system, a 3D vector is added to the model that indicates where the floor of the room 110 is. In some embodiments, the 3D vector is generated or determined during the filming of the room 110. This can be achieved, for example, by using an accelerometer in the device that is used to create the images for the model of the room 110. In some embodiments, the 3D vector is added manually by a user following the generation of the 3D reconstruction. Various objects that are identified in the image are placed in their locations within the room 110. For example, doors, windows, outlets, etc. are placed in the 3D reconstruction where they appear in the images.

Ambiguity detector 150 is a component of the system that is configured to determine if two or more similar objects are present in the room 110. The ambiguity detector 150 interacts with the object recognition component 130 to determine if there are two similar objects in the room 110. When there are at least two similar objects in the room 110, the ambiguity detector 150 then determines whether it is possible to determine that the camera is focusing on a specific instance of the object. For example, if there are two chairs in the room 110, but one chair is on the far left of the image and one is in the center of the image, the ambiguity detector 150 would determine that the chair in the center of the image is the object in focus, and thus no ambiguity exists. However, if the camera is focusing on a table in the center of the image, and there are two telephones on the table, the ambiguity detector 150 would determine that there is an ambiguity. As there is an ambiguity the ambiguity detector 150 attempts to resolve this ambiguity, by communicating with the question and answer system 160. Again the ambiguity arises as the camera system cannot determine which of the two similar objects the camera is actually focusing on.

Question and answer system 160 is a component of the system that interacts with a user to resolve an ambiguity determined by the ambiguity detector 150. The question and answer system 160 receives the detected ambiguity from the ambiguity detector 150. It also receives from the model generator 140 the 3D reconstruction of the room 110. The question and answer system 160 then designates a particular spot in the room 110 within the 3D reconstruction, and also determines a particular direction from that spot towards one of the walls in the room 110. The location that is determined by the question and answer system 160 typically will be a location that allows for simple questions to be asked to the user to determine the location of the objects in the room 110. In some embodiments, the question and answer system 160 will use known objects in the room 110 as reference points, such as doors, windows, paintings, etc. The question and answer system 160 then proposes questions to the user to resolve the ambiguity. For example, the question and answer system 160 may ask the user "If you stand at X and look towards Y, is the object to the right or left of you?" In some embodiments, the question and answer system 160 may cause a display to show the 3D reconstruction of the room 110, with X and Y labeled within the room 110. In another example, the question and answer system 160 may ask the user "If you stand next to the door is the object to the right or left of you?" Again the question and answer system 160 can display or otherwise highlight on the display which door it is referring to in the 3D reconstruction. In some embodiments, the question and answer system 160 may use terms associated with what the ambiguous objects are determined to be. For example, the question and answer system 160 can refer to the object by its common name, such as telephone, outlet, chair, etc. Based on the response from the user, the question and answer system 160 can determine which of the objects the camera is focused on. Once identified, the system can make any necessary adjustments to the camera or recording elements.

Figure 2:
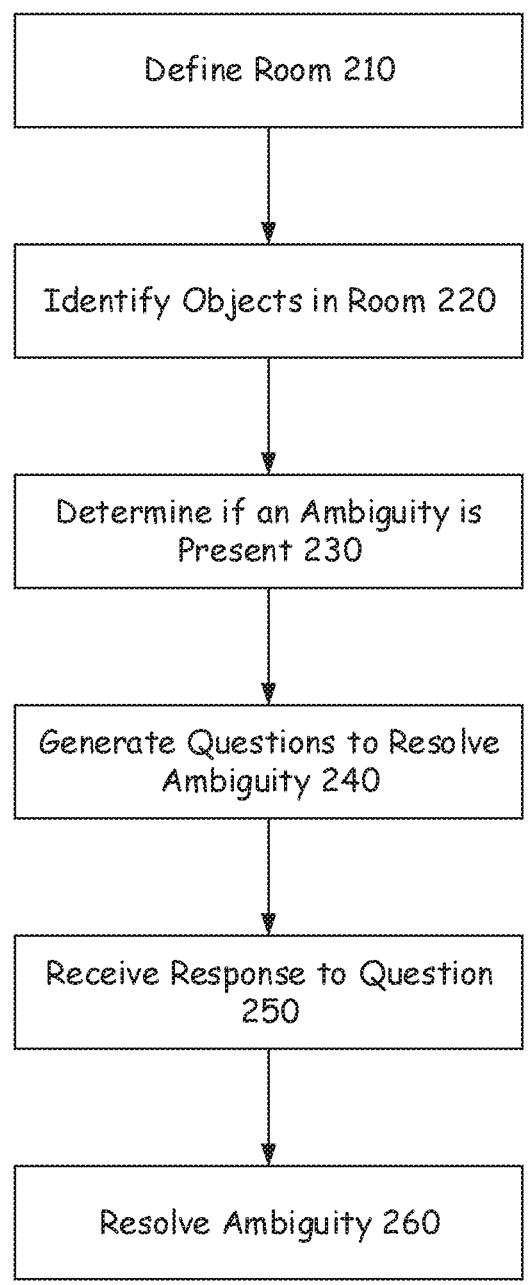
FIG. 2 is a diagrammatic illustration illustrating a relationship between segments in the persistent memory according to embodiments.

FIG. 2 is a flow diagram illustrating a process for managing an ambiguity in object recognition according to illustrative embodiments. Process 200 begins by defining a room 110 or other space. This is illustrated at step 210. The room 110 or other space can be any space where the camera can be placed to capture images of the room 110. The room 110 can have any number of walls, doors, windows, etc. In some embodiments, the room 110 is defined by the user taking a motion picture of the room 110 using a camera. The images taken by the camera are then processed to create a 3D reconstruction of the room 110. The reconstruction can be generated using any technique for converting captured images into 3 dimensional representations. In some embodiments, the user can manually create the reconstruction of the room 110 using software tools, such as computer aided design. Once the room 110 is converted into a 3D representation a vector is added to the representation to indicate the floor plane. This vector can be added automatically during the image capturing process. For example, if the camera that is used to create the images includes an accelerometer, the accelerometer can be used to determine the location of the floor. Alternatively, the user can simply manually add the vector or otherwise indicate where the floor is located.

Following the defining of the room 110, the process moves to identify objects within the room 110. This is illustrated at step 220. The object recognitions component identifies the various objects in the room 110, by comparing the objects with a set of objects in a library or other database of objects. Any process for identifying different objects in the room 110 can be used, such as appearance based methods, feature based method, genetic algorithms methods, etc. Objects are then placed in the 3D representation of the room 110 based on the known geometry of the room 110. As the walls were defined earlier in the creation of the room 110, windows, doors, outlets, tables, etc. are placed in the corresponding locations of the 3D representation. Additional objects are identified in the room 110 as well. These objects may be able to be oriented and placed in the room 110. The placement of the objects can be assisted by the vector that defined the floor of the room 110.

Once the objects have been identified in the room 110, the process determines if there are any ambiguous objects in the room 110. This is illustrated at step 230. The ambiguity detector 150 processes the various captured objects in the room 110. First the detector determines if there are two or more of the particular object located in the room 110. Then the ambiguity detector 150 determines if the location of the objects in the room 110 can be determined between the two or more similar objects. That is, the ambiguity detector 150 determines that a first instance of the object is in one distinct location in the room 110, and a second instance of the object is in a different distinct location in the room 110. If the ambiguity detector 150 is able to determine this, then no ambiguity is found between the objects. In some embodiments, the ambiguity detector 150 uses know objects in the room 110 as reference points. For example, the ambiguity detector 150 can use a known window in a room 110 as a reference point, and then determine from the window that the objects are significantly to the right or left of the window. This results in a determination that there is no ambiguity present. However, if the ambiguity detector 150 is not able to make such a determination, the objects will be determined to be ambiguous objects. The descriptions of the ambiguous objects are then provided to the question and answer system 160 for resolution of the ambiguity.

If there are any ambiguous objects in the room 110 the process proceeds to resolve the ambiguity. This is illustrated at step 240. In order to resolve the ambiguity the question and answer system 160 generates one or more questions to the user based on the detected ambiguous objects. These questions are based upon the locations of known objects and the ambiguous objects. A specific location within the room 110 can be determined as well as a direction. Based on this determination, the question and answer system 160 generates one or more questions to resolve the ambiguity. These questions are questions that require the user to provide information related to the location of the desired object in the image. For example, the user can be asked if the object is to the right or left of a reference object such as a door or window that is known to be in a particular location in the room 110.

The user responds to the questions presented at step 240 by providing answers that resolve the determined ambiguity. This is illustrated at step 250. The user can provide their answer to the question by typing in an answer to the question. For example, if the question was "If you stand at X and look towards Y, is the object to the right or left of you?" the user could answer by typing the word "Right" or "Left" as appropriate. In some embodiments, the user can reply to the question though a voice interface. The answer can then be processed through a speech to text system to generate a textual representation of the answer that can be provided back to the question and answer system 160. However, any approach for receiving an answer to the question can be used.

The process takes the inputted answers from the user and applies them to resolve the ambiguity. This is illustrated at step 260. In the example, where the question was user "If you stand at X and look towards Y, is the object to the right or left of you?", and the user entered "Left" the system would resolve the ambiguity such that the object to the left of X is the targeted object. In some embodiments, the camera is adjusted to more closely focus on the object in question. In some embodiments, an ID associated with the determined object is used to adjust features of the device. For example, the determined object may be a speaker phone, and using the associated ID for the speaker phones, this determination can be used to turn on the speaker phone that is in focus, and to turn off the other speaker phone. However, any management and/or manipulation of the identified objects can be performed.

Figure 3:
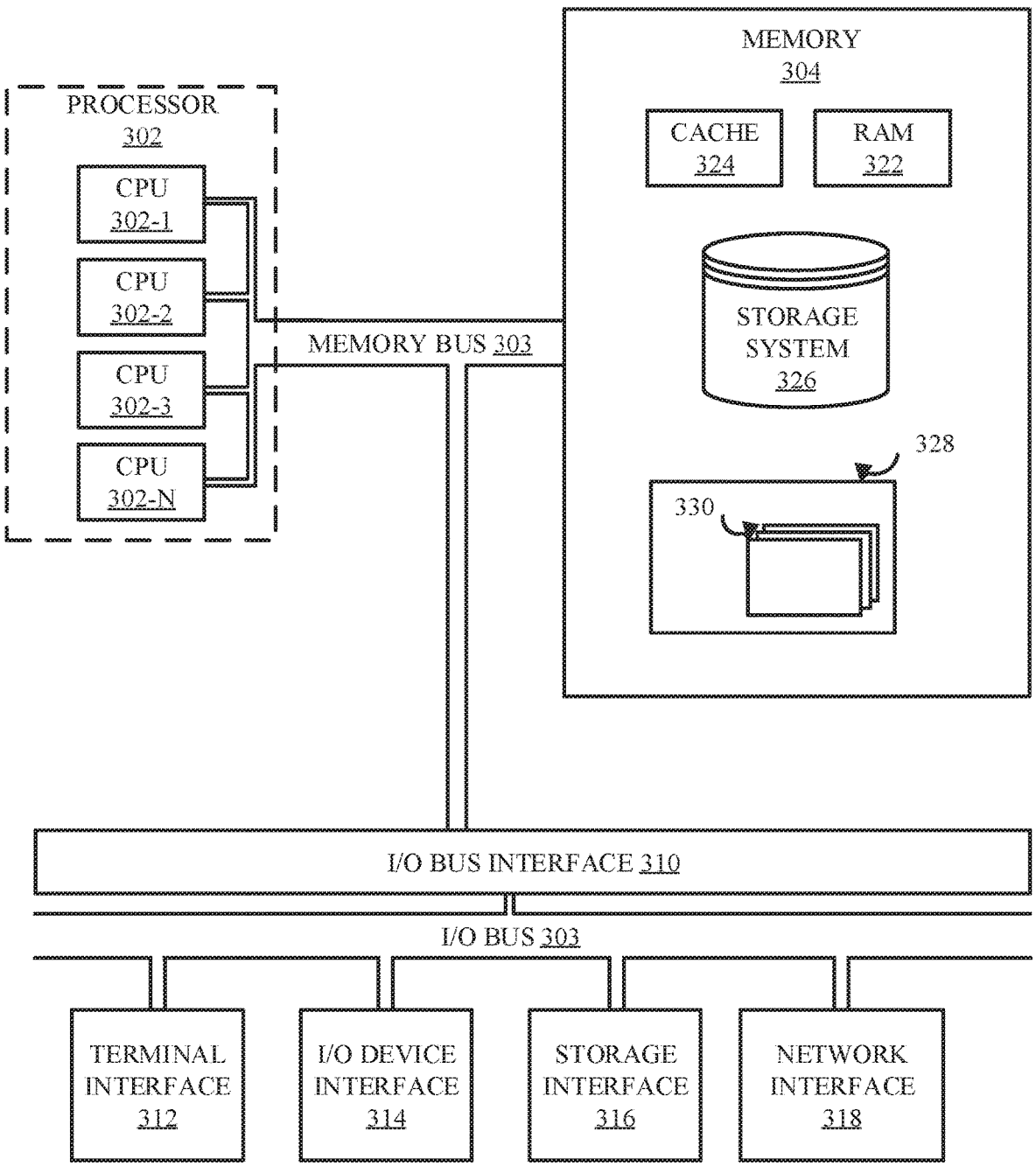
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
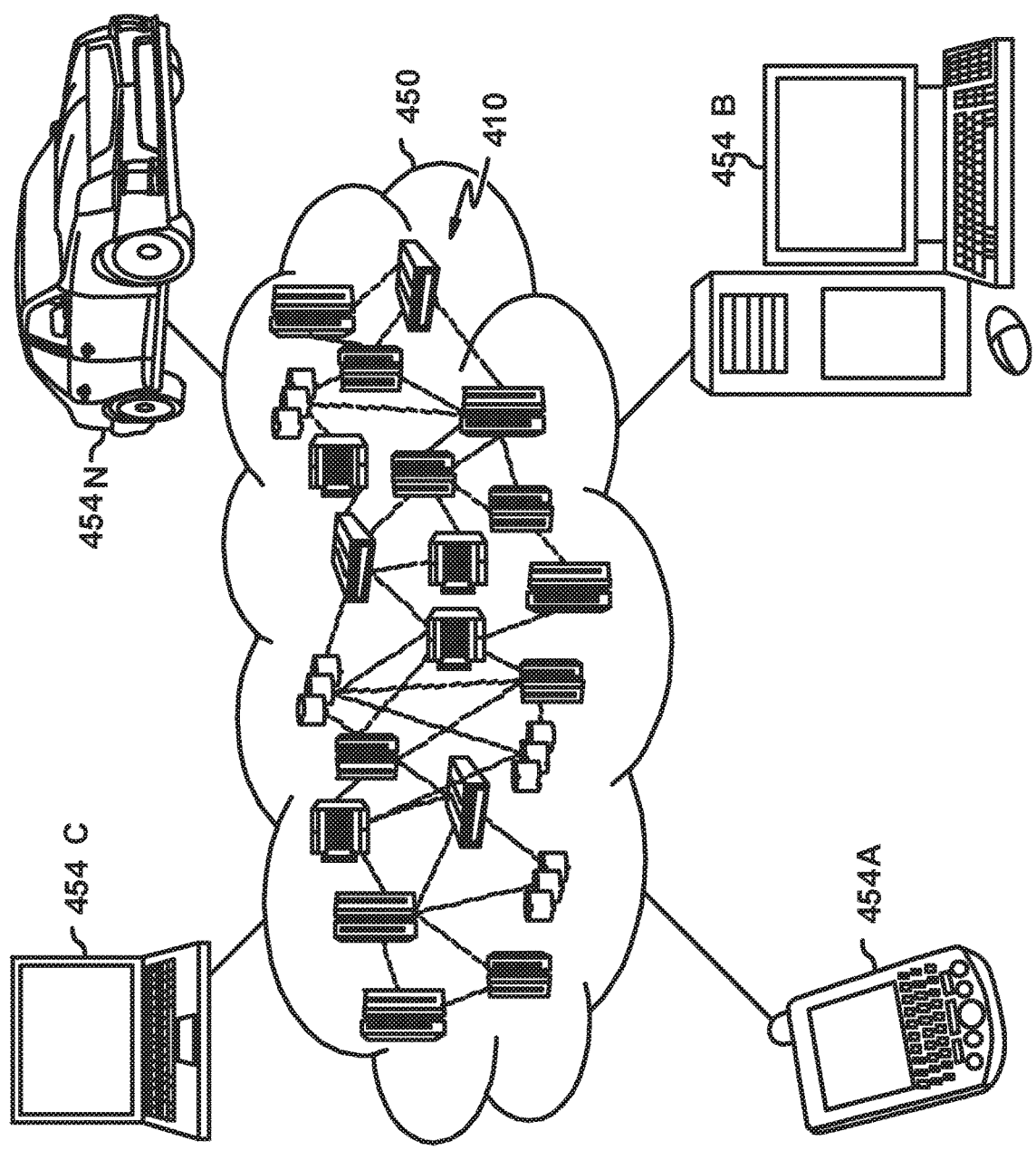
FIG. 4 is a diagrammatic representation of an illustrative cloud computing environment.

The system 100 may be employed in a cloud computing environment. FIG. 4, is a diagrammatic representation of an illustrative cloud computing environment 450 according to one embodiment. As shown, cloud computing environment 450 comprises one or more cloud computing nodes 454 with which local computing devices used by cloud consumers, such as, for example, personal digital assistant (PDA) or cellular telephone 454A, desktop computer 454B, laptop computer 454C, and/or automobile computer system 454N may communicate. Nodes 454 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 454 and cloud computing environment 450 may communicate with any type of computerized device over any type of network and/or network addressable connection (e.g., using a web browser).

Figure 5:
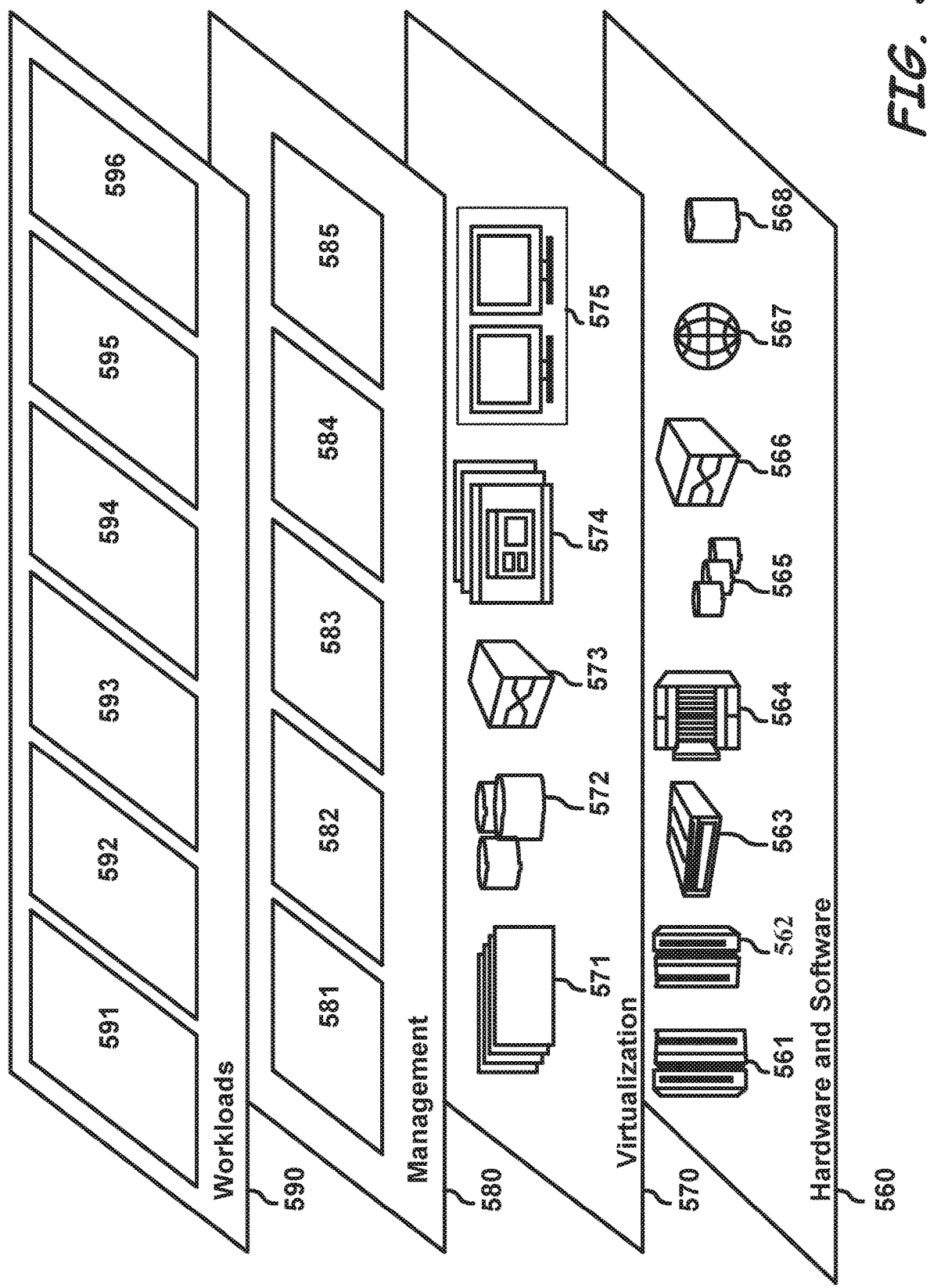
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for resolving object ambiguity in an image, comprising:

a camera disposed in a room, the camera configured to capture at least one image of the room including at least two objects that are visually similar;

an object recognition component configured to identify objects from an image, including the at least two objects that are visually similar;

a model generator configured to generate a three-dimensional representation of the room;

an ambiguity detector configured to determine an ambiguity in a position of the at least two objects, wherein the ambiguity is based on that a location of the at least two objects cannot be programmatically determined from the at least one image and no other location information about the at least two objects apart from the at least one image is available at a time the ambiguity is determined;

a question and answer system configured to provide at least one question based on the determined ambiguity, wherein the at least one question is provided to a user via a user display, wherein the at least one question is generated based on information known about the room from the model generator, and is phrased such that the ambiguity can be resolved, the question and answer system further configured to receive an answer to the at least one question, and based on the answer resolve the ambiguity; and wherein the system is configured to change at least one property of the at least two objects based upon resolution of the ambiguity.

2. The system of claim 1 wherein the object recognition component identifies at least reference object in the room, wherein the reference object is not the at least two objects that are visual similar.

3. The system of claim 2 wherein the reference object is in a known location within the room.

4. The system of claim 3 wherein the at least one question is based on the known location of the reference object.

5. The system of claim 3 wherein a 3D vector indicative of a floor of the room is added to the three dimensional representation of the room.

6. The system of claim 2 wherein the at least one question is based on the reference object.

7. The system of claim 1 wherein the model generator generates the three dimensional representation of the room from a video capture of the room.

8. The system of claim 1 wherein the change to at least one property turns on a feature of one of the objects and turns off the feature on another of the objects.

9. A method for resolving an ambiguity between similar objects in an image, the method comprising:
generating a three dimensional representation of a room;
identifying a plurality of objects in the room from at least one image of the room;
determining that at least two objects in the plurality of objects are visually similar, and a position of the at least two objects is ambiguous, wherein the ambiguity is based on that a location of the at least two objects cannot be programmatically determined from the at least one image and no other location information about the at least two objects apart from the at least one image is available at a time the ambiguity is determined;
generating, programmatically, at least one question based on the determined ambiguity, wherein the at least one question is generated based on information known about the room, and is phrased such that the ambiguity can be resolved by an answer to the question;
receiving from a user an answer to the question;
selecting one of the at least two objects based on the answer to the question received from the user; and
modifying at least one property of the at least two objects based upon the selection of one of the at least two objects.

10. The method of claim 9 further comprising:
identifying at least reference object in the room, wherein the reference object is not the at least two objects that are visual similar.

11. The method of claim 10 wherein the reference object is in a known location within the room.

12. The method of claim 11 wherein the at least one question is based on the known location of the reference object.

13. The method of claim 10 wherein the at least one question is based on the reference object.

14. The method of claim 9 wherein generating a three dimensional model generates the three dimensional representation of the room from a video capture of the room.

15. The method of claim 14 wherein a 3D vector indicative of a floor of the room is added to the three dimensional representation of the room.

16. The method of claim 9 wherein modifying at least one property further comprises:
turning on a feature of one of the objects; and
turning off the feature on another of the objects.

17. A computer program product having computer executable instructions, that when executed by one or more computing devices cause the computing devices to:
generate a three dimensional representation of a room;
identify a plurality of objects in the room from at least one image of the room;
determine that at least two objects in the plurality of objects are visually similar, and a position of the at least two objects is ambiguous, wherein the ambiguity is based on that a location of the at least two objects cannot be programmatically determined from the at least one image and no other location information about the at least two objects apart from the at least one image is available at a time the ambiguity is determined;
generate at least one question based on the determined ambiguity, wherein the at least one question is generated based on information known about the room, and is phrased such that the ambiguity can be resolved by an answer to the question;
receive from a user an answer to the question;
select one of the at least two objects based on the answer to the question received from the user; and
modify at least one property of the at least two objects based upon the selection of one of the at least two objects.

18. The computer program product of claim 17 further comprises instructions to:
identify at least reference object in the room, wherein the reference object is not the at least two objects that are visual similar.

19. The computer program product of claim 18 wherein the reference object is in a known location within the room, wherein the at least one question is based on the reference object, and wherein the at least one question is based on the known location of the reference object.

20. The computer program product of claim 17 wherein the instructions to modify at least one property further comprise instructions to:
turn on a feature of one of the objects; and
turn off the feature on another of the objects.

* * * * *